United States Patent [19]
Allen et al.

[11] Patent Number: 5,410,979
[45] Date of Patent: May 2, 1995

[54] SMALL FIXED TEARDROP FAIRINGS FOR VORTEX INDUCED VIBRATION SUPPRESSION

[75] Inventors: Donald W. Allen, Katy; Dean L. Henning, Needville, both of Tex.

[73] Assignee: Shell Oil Company, Houston, Tex.

[21] Appl. No.: 204,021

[22] Filed: Feb. 28, 1994

[51] Int. Cl.[6] .............................................. F15D 1/10
[52] U.S. Cl. ................... 114/243; 114/265; 166/367; 175/7; 405/223.1
[58] Field of Search ............... 114/243, 265, 90; 405/211, 224.2, 223.1, 216; 166/367; 175/7

[56] References Cited

U.S. PATENT DOCUMENTS

| | | | |
|---|---|---|---|
| 1,408,868 | 3/1922 | Dutcher | 114/90 |
| 3,248,886 | 5/1966 | Blenkarn | 405/211 X |
| 3,352,118 | 11/1967 | Burkhardt | 114/243 X |
| 3,410,096 | 11/1968 | Schuh | 175/7 |
| 3,677,302 | 7/1972 | Morgan | 405/224.2 X |
| 4,100,752 | 7/1978 | Tucker | 405/224.2 X |
| 4,398,487 | 8/1983 | Ortloff et al. | 114/243 |
| 4,474,129 | 10/1984 | Watkins et al. | 114/243 |
| 4,657,116 | 4/1987 | Gardner et al. | 187/1 R |
| 4,784,529 | 11/1988 | Hunter | 405/223.1 X |

OTHER PUBLICATIONS

M. M. Zdravkovich, "Review and Classification of Various Aerodynamic and Hydrodynamic Means for Suppressing Vortex Shedding," *Journal of Wind Engineering and Industrial Aerodynamics,* 7 (1981) 145–189.

M. J. Every, R. King, and D. S. Weaver, "Vortex-Excited Vibrations of Cylinders and Cables and Their Suppression," *Ocean Engng.,* vol. 9, No. 2, pp. 135–157, 1982.

A. R. Packwood, "Performance of Segmented Swept and Unswept Cable Fairings at Low Reynolds Numbers," *Ocean Engng.,* vol. 17, No. 4, pp. 393–407, 1990.

*Primary Examiner*—Sherman Basinger
*Attorney, Agent, or Firm*—Del S. Christensen

[57] ABSTRACT

A non-rotatable fairing for suppression of vortex-induced vibration of a marine tubular is provided, the tubular having a circular cross section and a centerline that is normal to the circular cross section, the fairing comprising:

shaped sides that extend essentially tangentially from the outer surface of the tubular toward a point that is about a distance equal to the outside diameter of the tubular or less from the centerline of the tubular; and a means to fix the fairing to the tubular so that the fairing cannot rotate around the tubular, wherein the maximum length of the cross section of the combined fairing and tubular is between about 1.25 and about 1.5 times the outside diameter of the tubular.

8 Claims, 2 Drawing Sheets

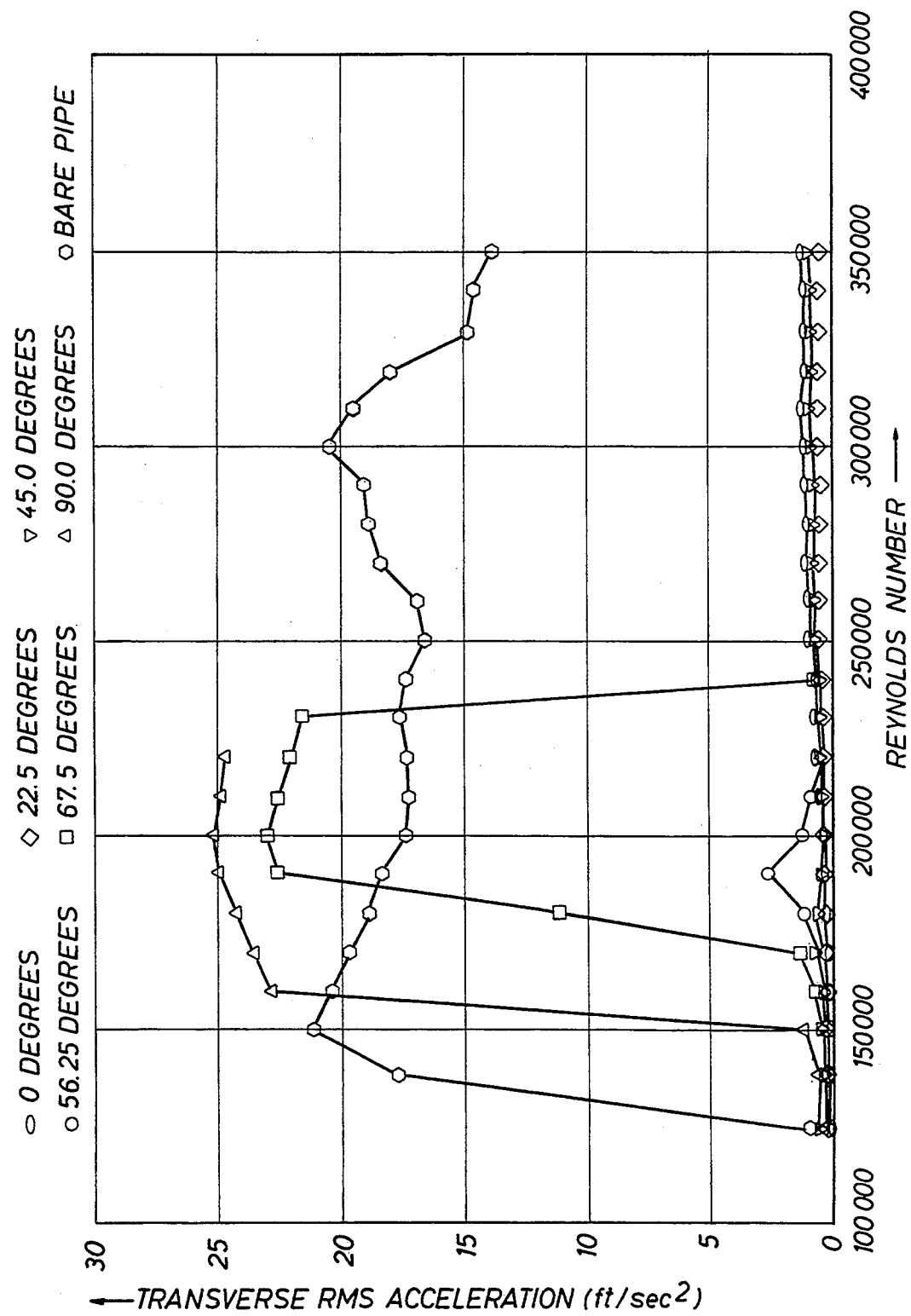

SMALL FIXED TEARDROP FAIRINGS FOR VORTEX INDUCED VIBRATION SUPPRESSION

FIELD OF THE INVENTION

This invention relates to a method and apparatus for reduction of vortex induced vibrations in marine environments.

BACKGROUND OF THE INVENTION

Production of oil and gas from off-shore fields has created many unique engineering challenges. One of these challenges is dealing with effects of currents on long and unsupported pipe segments. These currents cause vortexes to shed from the sides of the pipes, inducing vibration. These vibrations can eventually lead to fatigue failures of the pipes.

For short segment of pipe, the pipe can be made strong enough to resist significant movement by the forces created by the shedding of vortexes. Alternatively, the pipe could be braced to prevent such movement or to change the frequencies at which the pipe would be excited by vortex shedding.

When unsupported segments of pipes must be very long, strengthening or bracing becomes impractical. Deep water production risers, drilling risers, platform export risers, and tendons for tension leg platforms are examples of pipes that are difficult or impossible to brace sufficiently to prevent some vibration due to vortex shedding. Pipelines traversing valleys on the ocean floor can also be unsupported for extended lengths.

Shrouds, strakes and fairings have been suggested for application to subsea pipes to reduce vortex induced vibrations. Strakes and shrouds can be made to be effective regardless of the relative direction of the current. But shrouds and strakes are generally less effective than fairings. Fairings are generally very effective in reducing vibrations due to vortex shedding, and also reduce drag forces on the pipe. But fairings have been thought to be effective only if the relative direction of the current is parallel to the axis of the fairing. U.S. Pat. Nos. 4,398,487 and 4,474,129 disclose fairings for use with subsea pipes and risers, and both of these patents disclose means to permit the fairing to rotate around the pipe or riser. The need to provide a rotatable fairing results in a very expensive apparatus. Further, the subsea environment in which the fairings are intended to operate will likely eventually lead to failure of the fairing to rotate. These references prefer fairings having a length to width ration of two or greater, so failure of the fairing to rotate would result in excessive drag forces being exerted on the pipe when the current is not aligned with the fairing. These rotatable fairings have therefore only been applied to drilling risers, not risers that would remain in service for extended time periods.

It is therefore an object of the present invention to provide a fairing that is effective to reduce vibration of a tubular caused by vortex shedding. It is a further object to provide such a fairing wherein the fairing can be provided in a fixed position on a tubular, and not cause significant increases in drag forces or vortex induced vibration when currents are not parallel to the axis of the fairing. In another aspect, it is an object of the present invention to provide a method to control vortex shedding induced vibrations utilizing such a fairing.

SUMMARY OF THE INVENTION

These and other objects are accomplished by a non-rotatable fairing for suppression of vortex-induced vibration of a marine tubular having a circular cross section and a centerline that is normal to the circular cross section, the fairing comprising:

shaped sides that extend essentially tangentially from the outer surface of the tubular toward a point that is about a distance equal to the outside diameter of the tubular or less from the centerline of the tubular; and a means to fix the fairing to the tubular so that the fairing cannot rotate around the tubular, wherein the maximum length of the cross section of the combined fairing and tubular is between about 1.25 and about 1.5 times the outside diameter of the tubular.

This fairing is surprisingly effective in reducing vibrations caused by vortex shedding, and is very simple and inexpensive to provide. The fairing is fixed to the tubular in a set position. Because of its size, the fairing does not significantly increase vibrations or drag forces when currents are not parallel to the axis of the fairing.

The fairing of the present invention can be fabricated from a metal such as galvanized steel or stainless steel, or a polymer. Because the fairing is relatively small, significant strength is not required. The fairing can be installed prior to installation of the tubular, or the fairing may be installed insitu.

BRIEF DESCRIPTION OF THE FIGURES

FIG. 3 is a plot of traverse acceleration for fairings of the present invention as a function of current Reynolds number for flow at various angles to the axis of the fairing.

DETAILED DESCRIPTION OF THE INVENTION

Figure 1A:
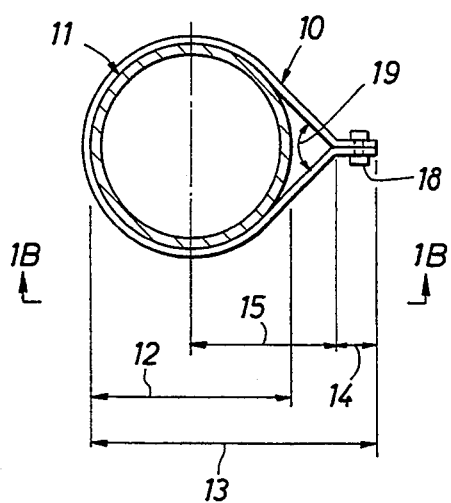
FIG. 1A and 1B are, respectively, a side view and a top view of the fairing of the present invention.
Figure 1B:
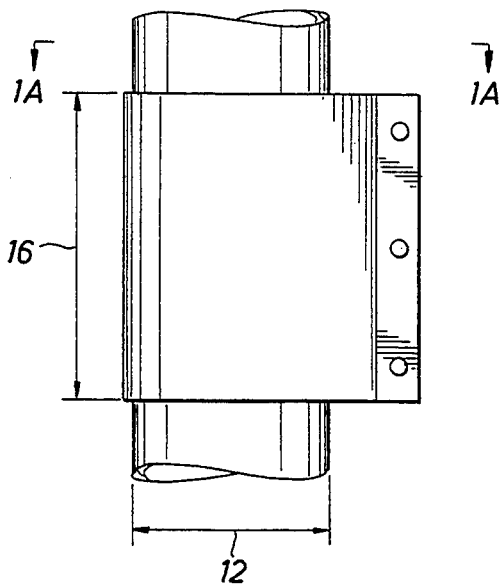
Figure 2:
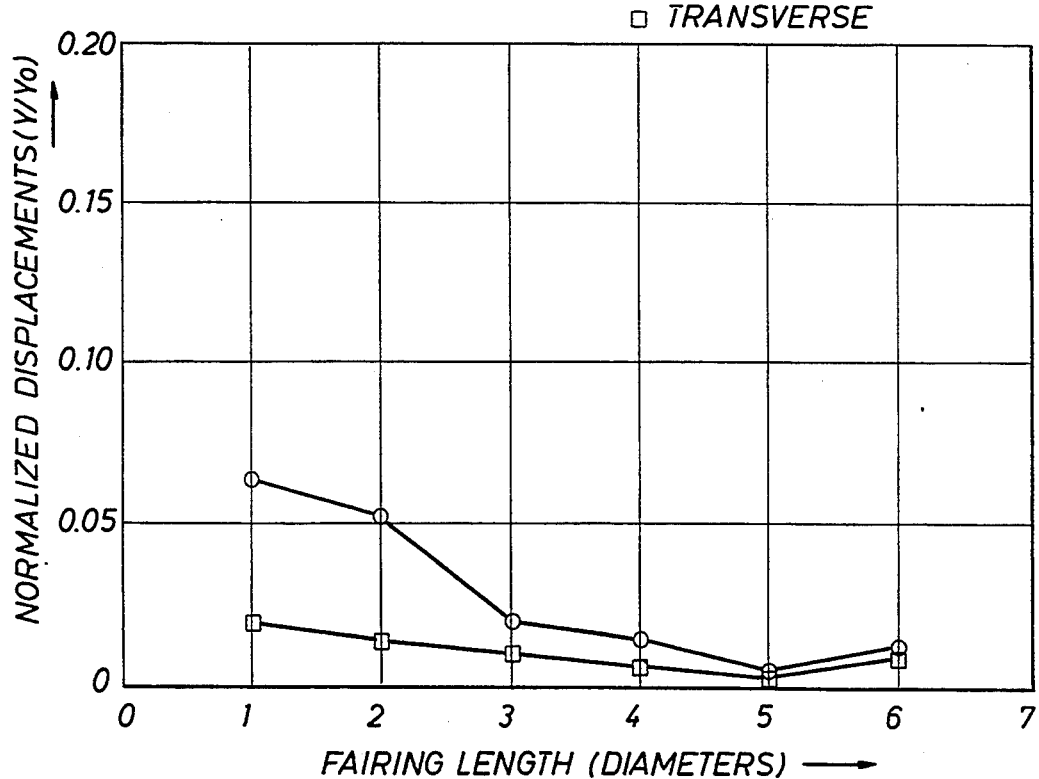
FIG. 2 is a plot of normalized displacements vs. fairing lengths for fairings of the present invention and fairings that are longer than those of the present invention.

Referring now to FIGS. 1A and 1B, two views of a fairing of the present invention are shown. A tubular, 11, is shown surrounded by a fairing, 10. The tubular has an outside diameter, 12. The tubular could be, for example, a production riser, a drilling riser, a leg to a platform, a tendon to a tension leg platform, or an unsupported segment of pipe. The fairing has a total length, 13, which is preferably between about 1.25 and about 1.5 times the diameter. Of the total length, a tail length, 14, extends for a distance of about 0.1 to about 0.3 times the diameter. The fairing, 10, includes tangent sections, 20, that extend from tangent to the outside diameter of the tubular and converge at the beginning of the tail length. The distance from the centerline of the tubular to the point where the tangent sections converge is preferably between about 0.75 and about 1.0 times the outside diameter of the tubular. The tangent sections could converge at the end of the fairing, eliminating the flat section, and the tangent sections could be curved rather than flat as FIGS. 1 and 2 show. Flat tangent sections are preferred because they simplify fabrication of the fairing.

The angle, 19, at which the tangent sections converge may be about 90 degrees. This angle results in a tail section of about 0.2 times the outside diameter of the tubular when the total length of the fairing and tubular is about 1.45 times the outside diameter of the tubular.

The height of the fairing, 16, can vary considerably depending upon the materials of construction and the method to be employed to install the fairing. Typically, numerous fairings according to the present invention are placed along the length of the tubular. The entire length of tubular could be covered with fairings, but this will usually not be necessary. Typically, covering about ¼ to ½ of the length of the tubular with fairings will result in significant suppression of vortex induced vibrations.

The fairing of the present invention can be made from a flat sheet of material, wrapped around the tubular, and connected in the tail section with fasteners, 18. The fasteners may be, for example, rivets, bolts with lock nuts, clips, or snaps. Rather than providing a separate fastener, an edge of the fairing could be folded over and then crimped onto the other edge of the fairing after the fairing has been wrapped around the tubular. The fairing is held in a fixed position to prevent rotation by friction or by a clamp.

Rather than to provide a fairing that wraps around the tubular and connects at the back as shown in FIGS. 1A and 1B, the fairing could be formed into a triangular shape, and fastened to the tubular by a means such as straps.

EXAMPLE

Fairings having varying lengths were tested to demonstrate the effectiveness of short fairings. Referring now to FIG. 2, a plot of normalized displacement is shown as a function of the length of the fairing for both traverse and inline displacement. The fairing length of FIG. 2 is the distance between the end of the fairing and the centerline of the tubular. Measurements were made with about 10 ft/sec fluid velocity in a current tank. The tubular tested was a 72-inch long, ⅜-inch o.d., 6061-T6 aluminum pipe. A Columbia Model HEVP-12 biaxial accelerometer was placed in the aluminum pipe to measure displacements. Accelerometer data was double integrated to produce a displacement-time history, and then root-mean-square displacements were calculated from the time history. The normalized displacements are the root mean square displacements divided by the root mean square displacement measured with bare pipe.

From FIG. 2 it can be seen that the short fairings of the present invention are almost as effective in reducing vibration as fairings having considerable length.

FIG. 3 is a plot of traverse acceleration for fairings of the present invention as a function of current Reynolds number for water flow at various angles to the axis of the fairing. The fairing used had a length over width of 1.35, and was of a shape similar to that shown in FIGS. 1A and 1B. From FIG. 3 it can be seen that the fairing of the present invention is effective even with flow approaching the fairing at an angle of 56 degrees. What is even more significant is that the fairing does not result in significantly more vibration than bare pipe at 67 and 90 degrees relative flow. Therefore, if the fairing of the present invention is placed on a riser aligned with normally prevailing currents, occasional periods when the flow if from other directions will not cause significant problems. Because failure due to vibrations caused by vortex induced vibrations are generally expected to occur after extended time periods, some exposure to currents from a direction other than within about 60 degrees of the axis of the varying will not be of any consequence.

We claim:

1. A non-rotatable fairing for suppression of vortex-induced vibration of a marine tubular having a circular cross section and a centerline that is normal to the circular cross section, the fairing comprising:
    shaped sides that extend essentially tangentially from the outer surface of the tubular toward a point that is about a distance equal to the outside diameter of the tubular or less from the centerline of the tubular; and
    a means to fix the fairing to the tubular so that the fairing cannot rotate around the tubular, wherein the maximum length of the cross section of the combined fairing and tubular is between about 1.25 and about 1.5 times the outside diameter of the tubular, and the fairing is made from a flat sheet of material, wrapped around the tubular, and edges of the flat material connected at the centerline of the fairing.

2. The fairing of claim 1 wherein the marine tubular is a drilling riser.

3. The fairing of claim 1 wherein the marine tubular is a leg supporting a platform.

4. The fairing of claim 1 wherein the marine tubular is a tendon of a tension leg platform.

5. The fairing of claim 1 wherein the marine tubular is a production riser for production from a subsea oil or gas well.

6. The fairing of claim 1 wherein the marine tubular is an offshore platform export riser.

7. The fairing of claim 1 wherein the sides are each essentially flat.

8. A method to reduce vortex induced vibrations of a marine tubular having a circular cross section and a centerline that is normal to the circular cross section, the method comprising:
    providing a fairing, the fairing comprising,
    shaped sides that conform to the tubular and extend essentially tangentially from the outer surface of the tubular toward a point that is about 0.75 of the outer diameter of the tubular or less from the centerline of the tubular, and
    a means to fix the fairing to the tubular so that the fairing cannot rotate around the tubular, wherein the maximum length of the cross section of the combined fairing and tubular is between about 1.25 and about 1.5 times the outside diameter of the tubular, and the fairing is made from a flat sheet of material, wrapped around the tubular, and edges of the flat material connected at the centerline of the fairing; and
    fixing the fairing to the tubular.

* * * * *